United States Patent [19]

Blount

[11] 4,022,873

[45] May 10, 1977

[54] PROCESS FOR THE PRODUCTION OF ALKALI SILICOFORMIC CYANIDE

[76] Inventor: David H. Blount, 5450 Lea St., San Diego, Calif. 92105

[22] Filed: July 1, 1976

[21] Appl. No.: 701,594

Related U.S. Application Data

[63] Continuation-in-part of Ser. No. 598,999, July 25, 1975, abandoned.

[52] U.S. Cl. ............................. 423/325; 423/332; 423/365
[51] Int. Cl.$^2$ ......................................... C01B 33/00
[58] Field of Search ........... 423/325, 365, 335, 332

[56] References Cited

UNITED STATES PATENTS

| | | | |
|---|---|---|---|
| 3,093,451 | 6/1963 | Weisse et al. | 423/365 X |
| 3,826,814 | 7/1974 | Illigen et al. | 423/335 X |

*Primary Examiner*—Edward Stern

[57] ABSTRACT

Silicoformic acid is reacted with an alkali metal cyanide, in a ratio of about 1 mol of the silicoformic acid to about 1 to 2 mols of the alkali metal cyanide to produce corresponding substituted silicoformic cyanides and dicyanides.

2 Claims, No Drawings

PROCESS FOR THE PRODUCTION OF ALKALI SILICOFORMIC CYANIDE

CROSS-REFERENCE TO RELATED APPLICATIONS

This Application is a continuation-in-part of my copending U.S. Patent Application Ser. No. 598,999, filed July 25, 1975, now abandoned.

BACKGROUND OF THE INVENTION

This invention relates to a process for the production of certain alkali metal silicoformic cyanides by chemically reacting silicoformic acid (H.Si0.OH) with a suitable cyanide compound in a ratio of about 1:1 or 1:2 mols.

The silicoformic acid may be produced by the chemical reaction of a dry alkaline earth metal metasilicate or a dry alkali metal metasilicate with a mineral acid or a hydrogen containing acid salt. The silicoformic acid produced is washed with water, filtered and air dried to a granular white powder. Silicoformic acid, also known as monosilanic acid, may also be produced by other methods, such as those disclosed in U.S. Pat Nos. 3,674,430, 3,929,972, 3,954,941 and 3,962,067.

The silicoformic acid used in the following examples was produced by reacting dry granular alkali metal metasilicate with an hydrogen containing acid salt or a concentrated mineral acid. The white granules of silicoformic acid were washed with water, filtered, and then air dried at 25° to 75° C. The silicoformic acid granules were analyzed by Infrared analysis, using the 1R KBr disc method.

The Infrared analysis showed the presences of Si—H bonds. The Infrared analysis was very similar to that obtained with Mallinckrodt's hydrated silica except for the area which shows the presence of Si—H bonds. The Mallinckrodts hydrated silica ($SiO_2 \cdot xH_2O$) has a molecular weight of 60.09. $xH_2O$. The silicoformic acid produced contains an active hydrogen which will reduce silver nitrate in an aqueous solution which is evidence that Si-H bonds are present.

When the said silicoformic acid is heated much above 105° C, silicon dioxide with a molecular weight of about 60 is produced. On further heating, it has a melting point of 1650° C. In Cryoscopic and ebullioscopic determination, the silicoformic acid produced was not soluble in any common organic solvent but was readily soluble in dilute alkali metal hydroxide aqueous solutions.

The molecular weight was determined from the boiling point elevation of the said silicoformic acid in a 6N sodium hydroxide solution and indicated a molecular wieght of 78 ± 25gm/mol. This type of reactive solution normally changes the molecular species. However, this would seem to indicate the absence of a polymeric form of silicate. This analysis may indicate a possible formula of $HSi(OH)_3$ (orthosilicoformic acid) and the presence of some metasilicic acid ($H_2SiO_3$). The Orthosilicoformic acid, when dried, will lose water to form silicoformic acid. Other silicoformic acid such as polysilicoformic acid and orthosilicoformic acid may be used in my process.

The various alkali silico-formic cyanide compounds produced are useful as an intermediate in the production of many silicoformic organic compounds, such as silicoformic amines, silicoformic isocyanates, silicoformic organic acids, silicoformic cyanides, silicoformic organic esters and other silico organic compounds.

SUMMARY OF THE INVENTION

Basically, the process of this invention comprises reacting about 1 mol of silicoformic acid with from about 1 to 2 mols of an alkali metal cyanide, ammonium cyanide or hydrogen cyanide in an aqueous solution. The solution is preferable heated to the boiling point of the solution to evaporate the solution, leaving as a granular product a substituted silicoformic cyanide.

The alkali substituted silicoformic cyanide may be further reacted with an acid to produce granular silicoformic cyanide and a salt.

DETAILED DESCRIPTION OF THE INVENTION

While details of the mechanism of the reactions I obtain are not fully understood, it is thought that the basic reaction takes place as follows:

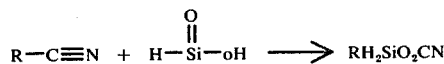

where R is an alkali metal, ammonium or hydrogen radical. Where a dicyanide is produced, the reaction is theorized to take place as follows:

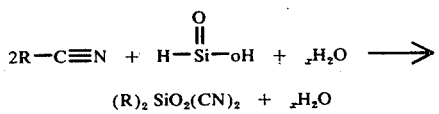

where R is an alkali metal, ammonium or hydrogen radical.

Any suitable cyanide compound may by reacted with silicoformic acid in the process of this invention. Typical cyanides include sodium cyanide, potassium cyanide, lithium cyanide, cadmium cyanide, cesium cyanide, ammonium cyanide, hydrogen cyanide and other metal cyanides. In general, best results have been obtained with alkali metal cyanides which are therefore preferred. Of these, optimum results are obtained with sodium cyanide and potassium cyanide.

The reactions discussed above may be conducted under any suitable physical conditions. While the reactants may be mixed in any suitable proportions, generally approximately stoichiometric proportions are preferred. Thus, the formation of a silicoformic cyanide will ordinarily require about 1 mol each of the silicoformic acid and the selected cyanide compound. Production of a substituted silicoformic dicyanide will generally require about 1 mol silicoformic acid for each about 2 mols of the selected cyanide compound.

While the reactants may be brought into contact in any suitable manner, mixing in an aqueous solution is generally preferred. The reaction may be conducted at any suitable temperature. Generally, it is convenient to remove the water by heating the solution to speed evaporation of the water.

If desired, the substituted silicoformic cyanides prepared by the novel process described above may be further chemically reacted with suitable organic halides, sulfates or phosphates to form new organic silicoformic cyanates. Ths silicoformic cyanide compounds may also be oxidized by suitable peroxides, may form acid salts by reaction with suitable acids, or may be converted to silicoformic amines, silicoformic isocyanates, silicoformic organic acids, silicoformic organic esters, silicoformic organic polymers and other silicoformic organic compounds.

DESCRIPTION OF PREFERRED EMBODIMENTS

My invention will be illustrated in greater detail in the following Examples which describe various preferred embodiments of the process of this invention. These Examples are merely illustrative of novel processes and do not limit the procedures which may be used in the production of my novel silicoformic cyanide compounds. Parts and percentages are by weight unless otherwise indicated.

EXAMPLE I

About 60 parts by weight of silicoformic acid produced by the method in U.S. Pat. No. 3,956,466 and about 50 parts by weight of potassium cyanide are mixed together and about 200 parts by weight water is added. The mixture is agitated and heated to about 120° C until the water evaporates. The product is a dry, light brown, granular compound, potassium silicoformic cyanide ($KH_2SiO_2CN$).

EXAMPLE II

About 60 parts by weight of silicoformic acid and about 50 parts by weight of sodium cyanide are mixed together and about 200 parts by weight of water are added. The mixture is heated to about 100° C until the water evaporates, producing a light brown, granular compound, sodium silicoformic cyanide ($NaH_2SiO_2CN$).

EXAMPLE III

About 60 parts by weight of silicoformic acid and about 120 parts by weight of sodium cyanide are mixed, and about 150% water is added by weight. The mixture is heated to about 110° C until the water has evaporated, producing dark brown granules of disodium silicoformic dicyanide [$(Na)_2SiO_2(CN)_2$] and sodium silicoformic cyanide. About 200% water by weight is added; disodium silicoformic dicyanide goes into solution, and the sodium silicoformic cyanide remains as light brown granules. The solution of disodium silicoformic dicyanide is filtered off, and the water is evaporated, thereby recovering the disodium silicoformic dicyanide, brown, soft granules.

EXAMPLE IV

About 60 parts by weight of silicoformic acid, about 80 parts by weight of potassium cyanide and about 150 parts by weight of water are mixed, then heated to about 110° C until the water evaporates, thereby producing dipotassium silicoformic dicyanide and potassium silicoformic cyanide. About 200 parts water by weight are added, and the dipotassium silicoformic dicyanide goes into solution and is filtered off, leaving the insoluble potassium silicoformic cyanide behind. The solution of dipotassium silicoformic dicyanide is evaporated, thereby recovering the dipotassium silicoformic dicyanide.

Example V

About 1 part by weight of mixture of silicoformic acid and polysilicoformic acid, about 2 parts by weight of sodium cyanide and about 3 parts by weight of water are added. The water is evaporated at 25° C to 40° C, thereby producing brown granules of poly(sodium silicoformic cyanide) and poly(disodium silicoformic dicyanide). About 4 parts by weight of water are added, the poly(disodium silicoformic dicyanide) goes into solution.

EXAMPLE VI

About 60 parts by weight of silicoformic acid, about 100 parts by weight of sodium cyanide and about 200 parts of water by weight are mixed, then heated to about 105° C until the water evaporates, hereby producing brown granular disodium silicoformic dicyanide and sodium silicoformic cyanide.

About 200 parts water by weight are added, and the disodium silicoformic dicyanide goes into solution and is filtered off, leaving the insoluble light brown granules of sodium silicoformic cyanide.

A sufficient amount of dilute hydrochloric acid is added to the solution of disodium silicoformic dicyanide to bring the solution to a pH of about 7, and light brown granules of silicoformic dicyanide are precipitated; the water is then filtered off, and the light brown granules are air dried.

A sufficient amount of dilute hydrochloric acid is added to the brown granules of sodium silicoformic cyanide until the pH is about 6, thereby producing blue granules of silicoformic cyanide. The water is filtered off, and the silicoformic cyanide is air dried.

EXAMPLE VII

About 60 parts by weight of a mixture of silicoformic acid orthosilicoformic acid, polysilicoformic acid and metasilicic acid, 90 parts by weight of sodium cyanide and 300 parts by weight of water are mixed, then heated to about 105° C until the water evaporates, thereby producing brown granules of poly(sodium silicoformic cyanide), poly (disodium silicoformic dicyanide) and sodium metasilicic cyanide.

EXAMPLE VIII

About 10 parts by weight of silicoformic acid and about 15 parts by weight of sodium cyanide are mixed, then heated to just above the melting point of sodium cyanide while agitating for about 20 to 40 minutes, thereby producing a brown granular mixture of disodium silicoformic dicyanide, sodium silicoformic cyanide and silicoformic acid.

I claim:

1. The method of preparing alkali metal silicoformic cyanide compounds by the following steps:
    a. mixing together in water, granular silicoformic acid and an alkali metal cyanide compound selected from the group consisting of sodium cyanide, potassium cyanide, lithium cyanide, cesium cyanide and mixtures thereof, in the ratio of 1 part by weight of silicoformic acid to 1 to 2 parts by weight of the alkali metal cyanide;
    b. evaporating water from said mixture, thereby producing a brown granular mixture of alkali metal silicoformic cyanide with the general formula, $RH_2SiO_2CN$, and dialkali metal silicoformic dicyanide with the general formula $R_2SiO_2(CN)_2$, wherein R is an alkali metal;
    c. adding water to said mixture; dialkali metal silicoformic dicyanide goes into solution and is filtered off, thereby recovering brown granules of alkali metal silicoformic cyanide;

d. evaporating water from aqueous solution of dialkali metal silicoformic dicyanide, thereby recovering brown, soft granules of dialkali metal silicoformic dicyanide.

2. The method of producing alkali metal silicoformic cyanide by the following steps:

a. mixing together granular silicoformic acid and an alkali metal cyanide compound selected from the group consisting of sodium cyanide, potassium cyanide, lithium cyanide, cesium cyanide and mixtures thereof, in the ratio of 1 part by weight of silicoformic acid to 1 to 2 parts by weight of the alkali metal cyanide;

b. heating said mixture to above the melting point of the alkali metal cyanide while agitating for 20 to 40 minutes, thereby c. producing a brown granular mixture of alkali metal silicoformic cyanide, with the general formula $RH_2SiO_2CN$, and dialkali metal silicoformic dicyanide, with the general formula $R_2SiO_2(CN)_2$, wherein R is an alkali metal;

d. adding water to said mixture; dialkali metal silicoformic cyanide goes into solution and is filtered off, thereby recovering brown granules of alkali metal silicoformic cyanide;

e. evaporating water from the aqueous solution of dialkali metal silicoformic dicyanide, thereby f. recovering soft, brown granules of dialkali metal silicoformic dicyanide.

* * * * *